United States Patent
Chmielarczyk et al.

(10) Patent No.: US 10,611,466 B2
(45) Date of Patent: Apr. 7, 2020

(54) FLUIDIC DEVICE

(71) Applicant: ROLLS-ROYCE plc, London (GB)

(72) Inventors: Pawel Chmielarczyk, Derby (GB);
Richard A. Young, Derby (GB);
Marko Bacic, Oxford (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 16/038,328

(22) Filed: Jul. 18, 2018

(65) Prior Publication Data
US 2019/0031321 A1    Jan. 31, 2019

(30) Foreign Application Priority Data
Jul. 25, 2017   (GB) .................................. 1711950.4

(51) Int. Cl.
*F15C 1/02* (2006.01)
*B64C 21/02* (2006.01)
(Continued)

(52) U.S. Cl.
CPC .............. *B64C 21/02* (2013.01); *F15B 21/12* (2013.01); *F15C 1/002* (2013.01); *F15C 1/10* (2013.01);
(Continued)

(58) Field of Classification Search
CPC . B64C 21/02; B64C 2230/04; B64C 2230/06; B64C 2230/18; F15B 21/12;
(Continued)

(56) References Cited

U.S. PATENT DOCUMENTS 3,159,169 A * 12/1964 Reader ...................... F15C 1/08
                                                                137/835
3,191,860 A *  6/1965 Wadey ...................... F15C 1/02
                                                                137/13
(Continued)

FOREIGN PATENT DOCUMENTS

GB       1227883 A  *  4/1971   .............. F15C 1/002
WO    2013061276         5/2013

OTHER PUBLICATIONS

Great Britain Search Report dated Jan. 9, 2018, issued in GB Patent Application No. 1711950.4.
(Continued)

*Primary Examiner* — Minh Q Le
(74) *Attorney, Agent, or Firm* — Simpson & Simpson, PLLC

(57) ABSTRACT

A fluidic device for providing analogue output control includes a main channel, a first control channel, a second control channel, a comparator which receives respective input fluid flows from the main, the first and the second control channels. The first control channel is configured such that the input fluid flow therefrom carries an oscillating pressure wave signal, the second control channel includes a flow regulator controllable to vary the mass flow rate of the input fluid flow from the second control channel, and the main channel is configured such that the input fluid flow therefrom is at a reference mass flow rate. The comparator is configured such that the input fluid flows from the first control and the second control channels act in combination on the input fluid flow from the main channel to produce an output fluid flow from the comparator having a PWM mass flow rate characteristic.

14 Claims, 4 Drawing Sheets

(51) Int. Cl.
  *F15C 1/00* (2006.01)
  *F15C 1/22* (2006.01)
  *F15C 1/14* (2006.01)
  *F15C 1/10* (2006.01)
  *F15C 1/16* (2006.01)
  *F15B 21/12* (2006.01)

(52) U.S. Cl.
  CPC .............. *F15C 1/14* (2013.01); *F15C 1/16* (2013.01); *F15C 1/22* (2013.01); *B64C 2230/04* (2013.01); *B64C 2230/06* (2013.01); *B64C 2230/18* (2013.01)

(58) Field of Classification Search
  CPC .... F15C 1/002; F15C 1/10; F15C 1/14; F15C 1/16; F15C 1/22
  USPC ................ 137/826, 833, 834, 835, 836, 841
  See application file for complete search history.

(56) References Cited

U.S. PATENT DOCUMENTS

| | | | | |
|---|---|---|---|---|
| 3,228,410 A | * | 1/1966 | Warren | F15C 1/08 137/818 |
| 3,266,507 A | * | 8/1966 | Groeber | F15C 1/10 137/821 |
| 3,393,692 A | | 7/1968 | Geary | |
| 3,404,701 A | * | 10/1968 | Akira | F15C 1/003 137/805 |
| 3,448,752 A | * | 6/1969 | O'Neill | F15C 1/08 137/826 |
| 3,576,291 A | * | 4/1971 | Taplin | F15C 1/16 137/810 |
| 3,937,195 A | | 2/1976 | Woods | |
| 4,252,498 A | | 2/1981 | Radcliff et al. | |
| 4,258,753 A | * | 3/1981 | Limpaecher | F15C 1/10 137/806 |
| 4,418,721 A | * | 12/1983 | Holmes | E21B 47/18 137/810 |
| 4,846,224 A | * | 7/1989 | Collins, Jr. | F15C 1/16 137/810 |
| 4,867,041 A | * | 9/1989 | Manion | F15C 1/16 91/3 |

OTHER PUBLICATIONS

V. Tesař, High-frequency fluidic oscillator, Sensors and Actuators A: Physical, vol. 234, Oct. 1, 2015, pp. 158-167.

K. Xu et al., Fluidic capacitor-based, self-contained and self-powered microfluidic chip, 15th International Conference on Miniaturized Systems for Chemistry and Life Sciences, Oct. 2-6, 2011, Seattle, Washington, USA, pp. 233-235.

* cited by examiner

FLUIDIC DEVICE

CROSS-REFERENCE TO RELATED APPLICATIONS

This application is based upon and claims the benefit of priority from British Patent Application No. GB 1711950.4, filed on 25 Jul. 2017, the entire contents of which are herein incorporated by reference.

BACKGROUND

Technical Field

The present disclosure relates to a fluidic device for providing analogue output control.

Description of Related Art

Fluidic components were used in the 1950s for building fluidic-based computers. However with invention of the transistor these had gone obsolete by the 1960s. Since then the use of fluidic components has been limited to niche applications such as the control of variable stator vanes on aero gas turbine engines (see for example U.S. Pat. No. 4,252,498).

Many fluidic devices are known, but common ones are based on the Coanda effect, which describes the tendency of a jet flow near a wall to attach to that wall through an entrainment process. A component that operates on this principle is a fluidic diverter, shown schematically in FIG. 1. The diverter has a main channel 1, a first control channel 2 and a second control channel 3. The diverter further has a first output channel 4 and a second output channel 5. Flows from the first and second control channels arrive in the diverter transversely to a flow from the main channel. By suitable control of the transverse control flows, which may be less than 20% of the mass flow rate of the main flow, an output flow can be switched between the first and the second output channels. Such a diverter can be thought as an amplifier with a typical gain>=5.

An advantage of such a component is the lack of moving parts, making it suitable for use in harsh environments, such as jet engines and nuclear reactors. A disadvantage, however, is that it is a digital component, which is unable to vary the output flow in a continuous manner.

FIG. 2 shows schematically at left another known fluidic device, in this case a vortex amplifier 6, and at right a plot of amplifier output against time. The amplifier has a primary flow source, a primary flow sink and a control valve 7 which allows servo fluid into the amplifier when opened. In the absence of servo fluid through the control valve, the fluid from the primary flow passes in a radial direction of the amplifier to the sink at a relatively high flow rate. Opening the control valve introduce the servo fluid, which generates a vortex in the amplifier. The resulting vortex produces an increased resistance to radial flow, and thus throttles the primary flow out of the sink to a leakage level. Thus the output from the amplifier is again essentially binary.

SUMMARY

In general terms, the present disclosure provides a fluidic device that extends the operation of known devices so as to provide an output which is suitable for use in analogue control, and thus enables greater levels of control and performance.

Accordingly, in a first aspect, the present disclosure provides a fluidic device for providing analogue output control, the device including:

a main channel, a first control channel and a second control channel, and a comparator which receives respective input fluid flows from the main, the first control and the second control channels;

wherein the first control channel is configured such that the input fluid flow therefrom carries an oscillating pressure wave signal, the second control channel includes a flow regulator which is controllable to vary the mass flow rate of the input fluid flow from the second control channel, and the main channel is configured such that the input fluid flow therefrom is at a reference mass flow rate; and wherein the comparator is configured such that the input fluid flows from the first control and the second control channels act in combination on the input fluid flow from the main channel to produce an output fluid flow from the comparator having a pulse width modulation mass flow rate characteristic.

Such a characteristic can be usable as an analogue control signal. The fluidic device may be adapted for controlling a gas turbine engine component(s). For example, the controlled gas turbine engine component(s) can be a bleed valve, variable guide vanes, variable stator vanes, or an air system providing turbine tip clearance control.

Accordingly, in a second aspect, the present disclosure provides a gas turbine engine having one or more fluidic devices according to the first aspect for controlling respective components of the engine.

Optional features of the present disclosure will now be set out. These are applicable singly or in any combination with any aspect of the present disclosure.

Conveniently, the first control channel may be configured such that the input fluid flow therefrom carries a saw tooth pressure wave signal.

In the context of a gas turbine engine, the reference mass flow rate may vary with engine cycle. However, conveniently, the main channel may be configured such that the input fluid flow therefrom is at a constant reference mass flow rate.

Typically, the first and second control channels are configured such that the input fluid flows therefrom are transverse to the input fluid from the main channel. Typically, the first and second control channels are configured such that the input fluid flows therefrom impinge at the same point on the input fluid from the main channel. Typically, the first and second control channels are configured such that the input fluid flows therefrom are opposed to each other.

The first control channel may extend in flow series through a fluidic oscillator and a fluidic capacitor to produce the oscillating pressure wave signal.

The flow regulator may be controllable to continuously and smoothly vary the mass flow rate of the input fluid flow from the second control channel. For example, the flow regulator can be a modulating valve.

The fluidic device may be configured such that input mass flow rates to the main, first control and second control channels are identical.

The comparator may be a fluidic diverter having first and second output channels and the output fluid flow may be a first output fluid flow taken from the first output channel, the input fluid flows from the first control and the second control channels acting in combination on the input fluid flow from the main channel to provide the first output fluid flow with the pulse width modulation mass flow rate characteristic. In such an arrangement, a second output fluid flow from the second output channel generally has an opposite pulse width modulation mass flow rate characteristic to the first output fluid flow. Typically, the output channels are configured such that the output fluid flows which flow therethrough are taken from the same point on the input fluid from the main channel. Typically, the output channels are configured such that the output fluid flows diverge at angles from the direction of the input fluid from the main channel. The angles are typically equal and opposite angles.

According to one option when the comparator is a fluidic diverter, a second output fluid flow may be taken from the second output channel, the device may further include a feedback loop from the second output channel to the second control channel, and the flow regulator is controllable to vary a proportion of the mass flow rate of a second output fluid flow entering the second control channel from the second output channel via the feedback loop. Such a feedback loop may typically be configured to take from 5% to 20% of the second output fluid flow from the second output channel.

Additionally or alternatively when the comparator is a fluidic diverter, the fluidic device may further include an actuator comprising a piston which is movable in a piston chamber, the piston chamber to one side of the piston receiving the first output fluid flow, and the piston to the other side of the piston receiving a second output fluid flow taken from the second output channel, whereby the position of the piston in the chamber is controllable by varying pulse widths in the pulse width modulation mass flow rate characteristic. The fluidic device may then further have a feedback control loop which controls the flow regulator to vary the mass flow rate of the input fluid flow from the second control channel on the basis of the piston position.

According to another option, a fluidic device in which the comparator is a fluidic diverter may further include a vortex amplifier having a source for receiving a flow of a primary fluid into the vortex amplifier, a sink through which the primary fluid leaves the vortex amplifier, and a control port for introducing a control fluid flow into the vortex amplifier, wherein the vortex amplifier is configured such that a relatively high mass flow rate of the control fluid forms a vortex from the primary fluid between the source and the sink to set a flow of the primary fluid from the sink to a relatively low level, and a relatively low or zero mass flow rate of the control fluid reduces or eliminates the vortex to set the flow of the primary fluid from the sink to a relatively high level; wherein the first output fluid flow from the fluidic diverter forms the control fluid flow into the vortex amplifier. When the comparator is a fluidic diverter and the first output fluid flow has a pulse width modulation mass flow rate characteristic, this option enables fast switching on and off of the vortex amplifier, which in turn enables it to effectively operate as an analogue device with a range of flows of the primary fluid from the sink rather than binary flows.

The fluidic device may be a pneumatic device.

DESCRIPTION OF THE DRAWINGS

Embodiments of the present disclosure will now be described by way of example with reference to the accompanying drawings in which.

DETAILED DESCRIPTION

Figure 3:
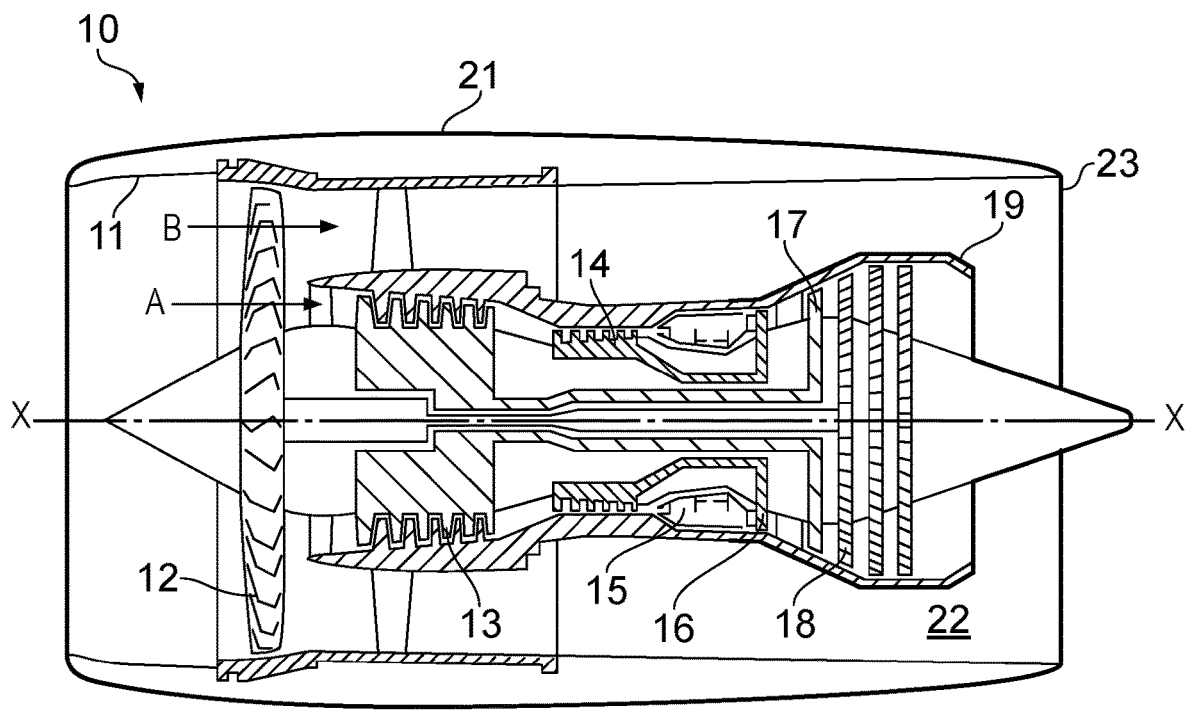
FIG. 3 shows a longitudinal cross-section through a ducted fan gas turbine engine.

With reference to FIG. 3, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The engine 10 has components such as bleed valves, variable guide vanes, variable stator vanes, and air systems for providing turbine tip clearance control. Such components may be controlled using an analogue control signal derived from the output fluid of a fluidic device. Advantageously, such a device can operate reliably in the harsh environment of the engine.

Figure 1:
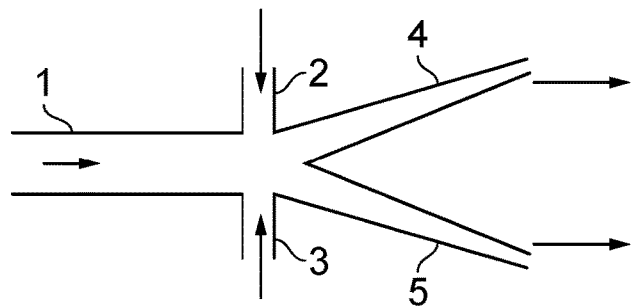
FIG. 1 shows schematically a fluidic diverter based on the Coanda effect.
Figure 2:
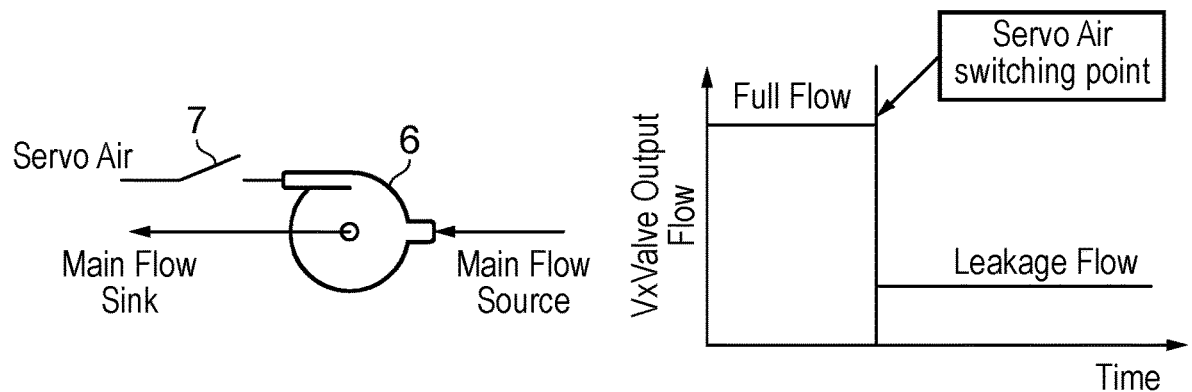
FIG. 2 shows schematically at left a vortex amplifier, and at right a plot of vortex amplifier output against time.
Figure 4:
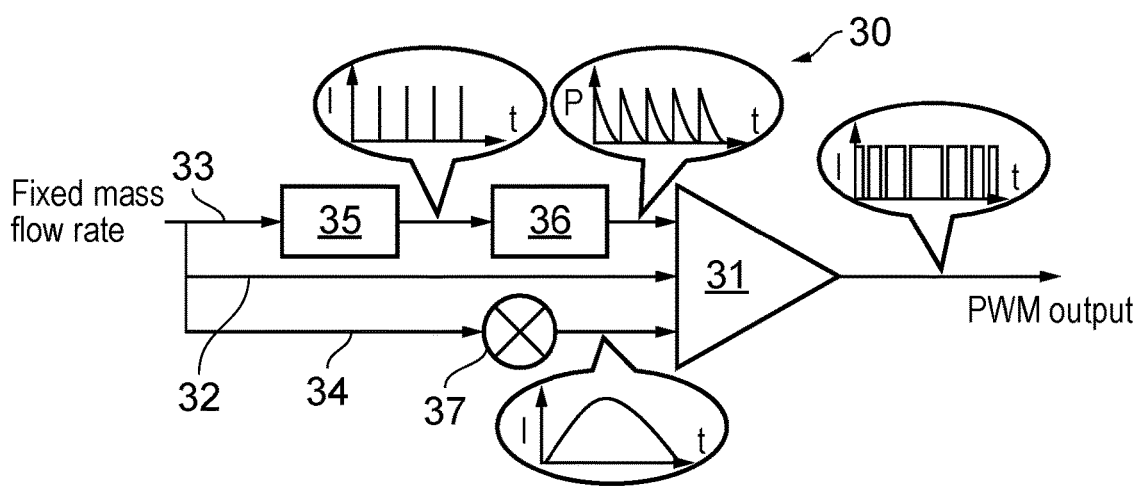
FIG. 4 shows schematically a fluidic device for controlling a component(s) of the engine of FIG. 3.

FIG. 4 shows schematically the fluidic device 30. A fluid diverter 31 of the type shown in FIG. 1 functions as a comparator, receiving respective input fluid flows from a main channel 32, a first control channel 33 and a second control channel 34, and producing an output fluid flow with a pulse width modulation (PWM) mass flow rate characteristic from a first one of its two output channels.

Conveniently, the main channel 32, first control channel 33 and second control channel 34 can receive fluid at an identical input mass flow rate.

The first control channel 33 has, in flow series, a fluidic oscillator 35 and a fluidic capacitor 36. The fluidic oscillator generates stable, constant frequency mass flow rate pulses. See for example, V. Tesař, *High-frequency fluidic oscillator*, Sensors and Actuators A: Physical, volume 234, 1 Oct. 2015, pages 158-167. The fluidic capacitor then filters the oscillator output to create an oscillating pressure wave signal, such as a saw tooth pressure wave signal. The capacitor can be implemented as an appropriately sized pressure chamber with an orifice. See for example, K. Xu et al., *Fluidic capacitor-based, self-contained and self-powered microfluidic chip,* 15th International Conference on Miniaturized Systems for Chemistry and Life Sciences, Oct. 2-6, 2011, Seattle, Wash., USA, pages 233-235. The fluidic oscillator and the fluidic capacitor preferably have no moving parts. Another option for producing the oscillating wave signal is to use a Hartmann or Galton whistle device.

The second control channel 34 has a flow regulator 37, e.g. in the form of a pneumatic, modulating valve, which is used to controllably vary the mass flow rate of the input fluid flow to the fluid diverter 31 from the second control channel. In particular, the mass flow rate from the second control channel determines the widths of the PWM mass flow rate pulses from the first output channel.

Thus a first output fluid flow from the fluid diverter 31 is the flow from the first output channel, which flow is set ON (corresponding to initiation of a PWM pulse) when the diverter receives a pressure spike from the first control channel 33. The first output fluid flow is kept switched ON (corresponding to the width of a PWM pulse) for a duration that is determined by the mass flow rate of the input fluid flow from the second control channel 34. Conversely, when the first output fluid flow is OFF (i.e. between its PWM pulses), the second output fluid flow from the second output channel is ON, producing an opposite (inverse) PWM mass flow rate characteristic to the first output fluid flow.

The PWM mass flow rate pulses can be modulated to produce an average mass flow rate value that is smoothly and continuously variable, and suitable for providing analogue control. Thus narrow pulses produce a low average mass flow rate and wide pulses a high average mass flow rate. The pulse frequency (i.e. ON-OFF switching speed) is determined depending on the size of the load (i.e. the load volume) such that during the OFF state the load pressure does not drop significantly (e.g. <1%).

Figure 5:
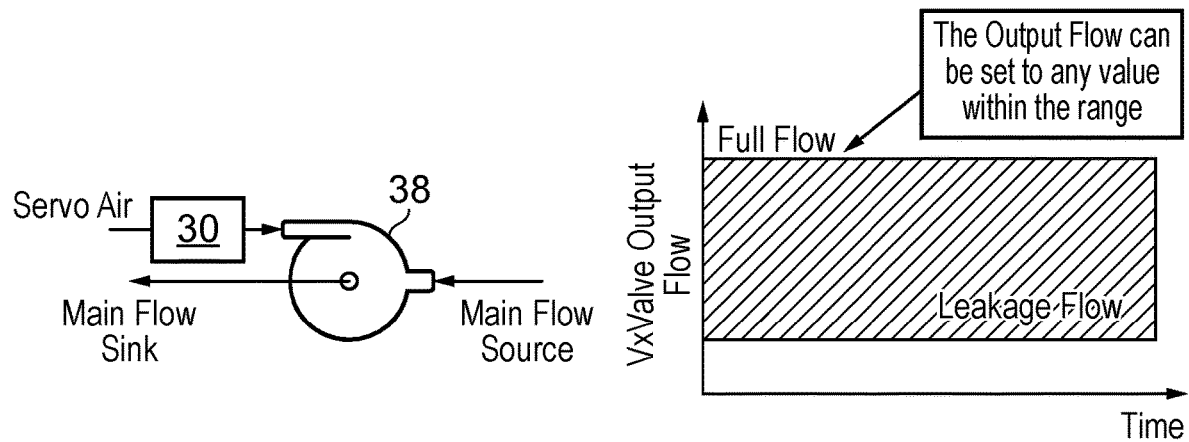
FIG. 5 shows schematically at left a vortex amplifier having the fluidic device of FIG. 4 as a controller, and at right a graph of vortex amplifier output against time.

Thus the longer the switch is ON compared to the OFF periods, the higher the total flow supplied to the load. Applied to the control input of a vortex amplifier, this allows a full modulation of the output flow from the amplifier rather than just the binary full and leakage flows. FIG. 5 shows schematically at left a vortex amplifier 38 having the fluidic device 30 in place of a conventional control valve, and at right a graph of amplifier output against time with the hatched area showing how the output from the primary flow sink can be set to any value within a range at any given moment.

Figure 6:
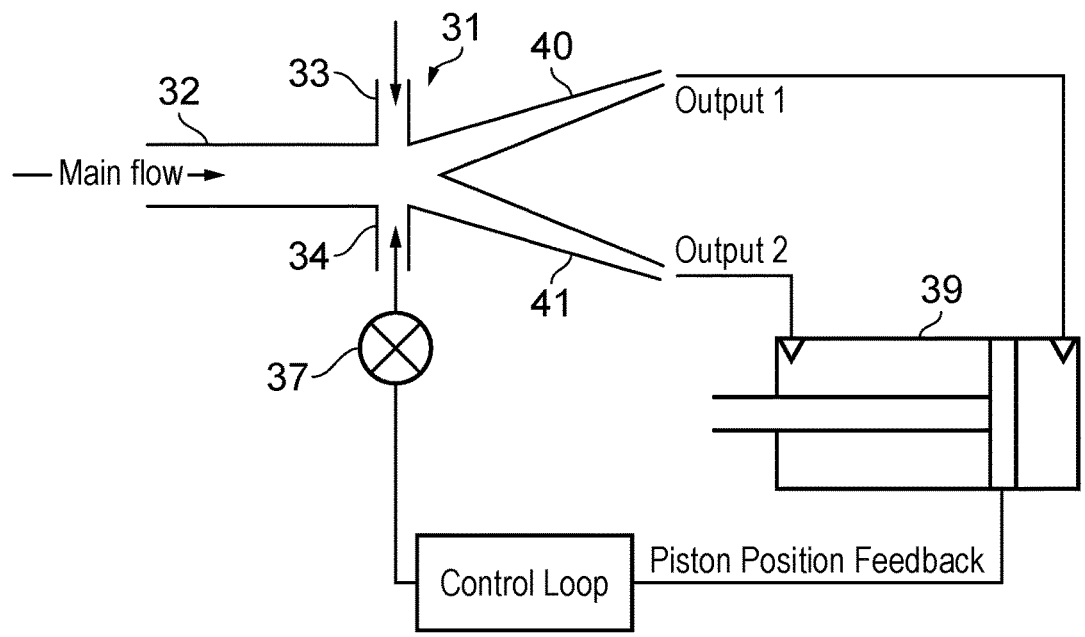
FIG. 6 shows schematically a fluid diverter of the fluidic device of FIG. 4 connected to a pneumatic piston type arrangement.

There are, however, other control possibilities. Thus FIG. 6 shows schematically the fluid diverter 31 of the fluidic device 30 connected to an actuator in the form of a pneumatic piston arrangement 39 in which, by connecting one of the output channels 40 of the diverter to the chamber on one side of the piston and connecting the other output channel 41 of the diverter to the chamber on opposite side of the piston, the direction of travel of the piston can be controlled by the duration of the ON periods relative to the OFF periods. In addition, feedback of piston position to the flow regulator 37 of the second control channel 34 can be used to provide closed loop control of piston movement. In this way, by adjusting a control setting of the flow regulator (i.e. effectively setting its "gain"), the piston position can be correspondingly adjusted.

Figure 7:
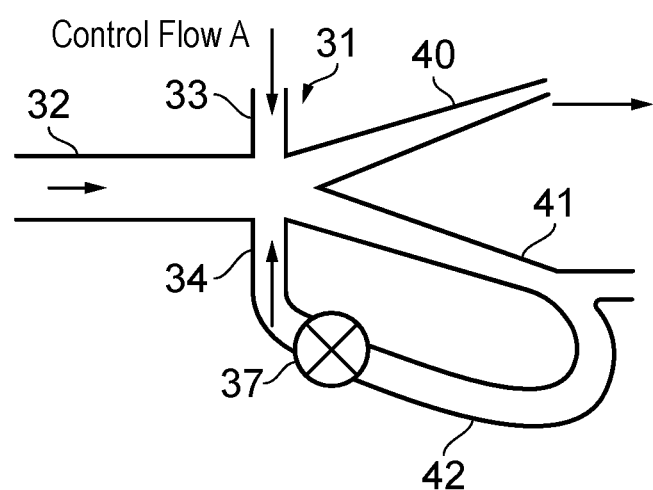
FIG. 7 shows schematically a variant fluidic device.

As another option, shown schematically in FIG. 7, the flow control of the second control channel 34 may be via a direct feedback loop 42 from the second output channel 41. The flow regulator 37 can be set such that the feedback loop typically takes from 5% to 20% of the second output fluid flow from the second output channel 41. As the first output fluid flow from the first output channel 40 goes to a high mass flow rate (i.e. a PWM pulse), the input fluid flow from the main channel 32 is pushed towards the second output channel 41, upon which the feedback tries to push the input fluid flow from the main channel back to the first output channel. Depending on the strength of the feedback, the input fluid flow from the main channel stays directed to the second output channel until the first input channel pressure spike reduces below a given value, as determined by the feedback from the second input channel moderated by the flow regulator setting.

Although described above in relation to a gas turbine engine, the fluidic device is advantageously applicable to other situations—particularly harsh environments where electronic control may not be suitable. Thus possible uses can be found in fields diverse as marine, automotive, industrial, processing industry, nuclear etc.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A fluidic device for providing analogue output control, the device including:

a main channel, a first control channel and a second control channel, and a comparator which receives respective input fluid flows from the main, the first control and the second control channels;

wherein the first control channel is configured such that the input fluid flow therefrom carries an oscillating pressure wave signal, the second control channel includes a flow regulator which is controllable to vary the mass flow rate of the input fluid flow from the second control channel, and the main channel is configured such that the input fluid flow therefrom is at a reference mass flow rate; and wherein the comparator is configured such that the input fluid flows from the first control and the second control channels act in combination on the input fluid flow from the main channel to produce an output fluid flow from the comparator having a pulse width modulation mass flow rate characteristic, wherein the comparator is a fluidic diverter having first and second output channels and the output fluid flow is a first output fluid flow taken from the first output channel, the input fluid flows from the first control and the second control channels acting in combination on the input fluid flow from the main channel to provide the first output fluid flow with the pulse width modulation mass flow rate characteristic, and wherein a second output fluid flow is taken from the second output channel, the device further includes a feedback loop from the second output channel to the second control channel, and the flow regulator is controllable to vary a proportion of the mass flow rate of the second output fluid flow entering the second control channel via the feedback loop.

2. A fluidic device according to claim 1, wherein the first control channel extends in flow series through a fluidic oscillator and a fluidic capacitor to produce the oscillating pressure wave signal.

3. A fluidic device according to claim 1, wherein the first control channel is configured such that the input fluid flow therefrom carries a saw tooth pressure wave signal.

4. A fluidic device according to claim 1, wherein the flow regulator is controllable to continuously and smoothly vary the mass flow rate of the input fluid flow from the second control channel.

5. A fluidic device according to claim 1, which is configured such that input mass flow rates to the main, first control and second control channels are identical.

6. A fluidic device according to claim 1 which is a pneumatic device.

7. A fluidic device according to claim 1 which is adapted for controlling a gas turbine engine component(s).

8. A gas turbine engine having one or more fluidic devices according to claim 1 for controlling respective components of the engine.

9. A fluidic device for providing analogue output control, the device including:
a main channel, a first control channel and a second control channel, and
a comparator which receives respective input fluid flows from the main, the first control and the second control channels;
wherein the first control channel is configured such that the input fluid flow therefrom carries an oscillating pressure wave signal, the second control channel includes a flow regulator which is controllable to vary the mass flow rate of the input fluid flow from the second control channel, and the main channel is configured such that the input fluid flow therefrom is at a reference mass flow rate; and
wherein the comparator is configured such that the input fluid flows from the first control and the second control channels act in combination on the input fluid flow from the main channel to produce an output fluid flow from the comparator having a pulse width modulation mass flow rate characteristic,
wherein the comparator is a fluidic diverter having first and second output channels and the output fluid flow is a first output fluid flow taken from the first output channel, the input fluid flows from the first control and the second control channels acting in combination on the input fluid flow from the main channel to provide the first output fluid flow with the pulse width modulation mass flow rate characteristic, and further including an actuator device comprising a piston which is movable in a piston chamber, the piston chamber to one side of the piston receiving the first output fluid flow, and the piston to the other side of the piston receiving a second output fluid flow taken from the second output channel, whereby the position of the piston in the chamber is controllable by varying pulse widths in the pulse width modulation mass flow rate characteristic.

10. A gas turbine engine having one or more fluidic devices according to claim 9 for controlling respective components of the engine.

11. A fluidic device according to claim 9 which is adapted for controlling a gas turbine engine component(s).

12. A fluidic device for providing analogue output control, the device including:
a main channel, a first control channel and a second control channel, and
a comparator which receives respective input fluid flows from the main, the first control and the second control channels;
wherein the first control channel is configured such that the input fluid flow therefrom carries an oscillating pressure wave signal, the second control channel includes a flow regulator which is controllable to vary the mass flow rate of the input fluid flow from the second control channel, and the main channel is configured such that the input fluid flow therefrom is at a reference mass flow rate; and
wherein the comparator is configured such that the input fluid flows from the first control and the second control channels act in combination on the input fluid flow from the main channel to produce an output fluid flow from the comparator having a pulse width modulation mass flow rate characteristic; and
further including a vortex amplifier having a source for receiving a flow of a primary fluid into the vortex amplifier, a sink through which the primary fluid leaves the vortex amplifier, and a control port for introducing a control fluid flow into the vortex amplifier, wherein the vortex amplifier is configured such that a relatively high mass flow rate of the control fluid forms a vortex from the primary fluid between the source and the sink to set a flow of the primary fluid from the sink to a relatively low level, and a relatively low or zero mass flow rate of the control fluid reduces or eliminates the vortex to set the flow of the primary fluid from the sink to a relatively high level;
wherein the first output fluid flow from the comparator forms the control fluid flow into the vortex amplifier.

13. A gas turbine engine having one or more fluidic devices according to claim 12 for controlling respective components of the engine.

14. A fluidic device according to claim 12 which is adapted for controlling a gas turbine engine component(s).

* * * * *